July 20, 1965 F. V. BROSSEIT 3,195,581
FORMING AND TRIMMING DIE
Filed Aug. 31, 1961 5 Sheets-Sheet 2

INVENTOR
F. V. BROSSEIT
By W. C. Parnell
ATTORNEY

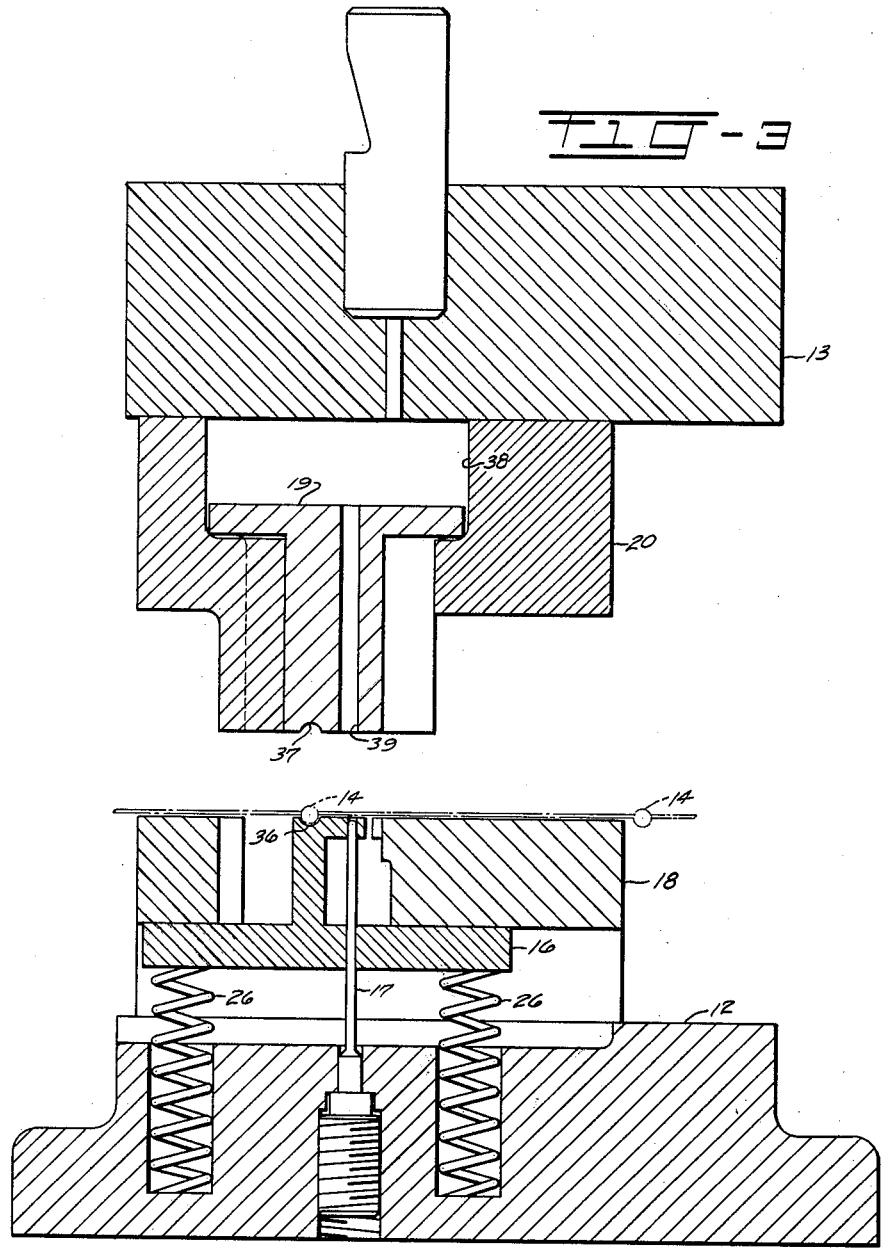

July 20, 1965 F. V. BROSSEIT 3,195,581
FORMING AND TRIMMING DIE
Filed Aug. 31, 1961 5 Sheets-Sheet 4
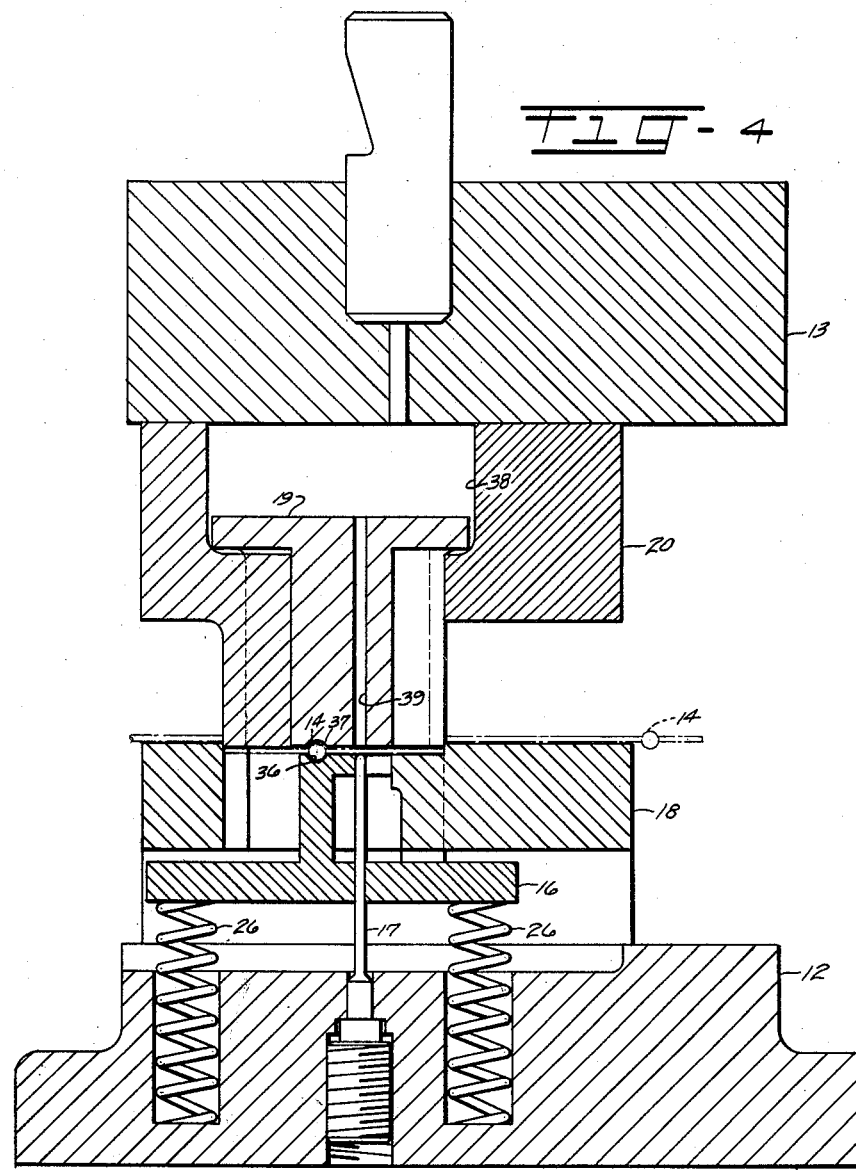
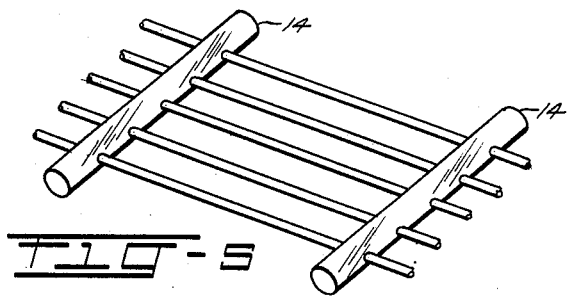
INVENTOR
F. V. BROSSEIT
By A. J. Nugent
ATTORNEY July 20, 1965 F. V. BROSSEIT 3,195,581
FORMING AND TRIMMING DIE
Filed Aug. 31, 1961 5 Sheets-Sheet 5

INVENTOR
F. V. BROSSEIT
By A. J. Nugent
ATTORNEY

United States Patent Office 3,195,581
Patented July 20, 1965

3,195,581
FORMING AND TRIMMING DIE
Fritz V. Brosseit, Kansas City, Mo., assignor to Western Electric Company, Incorporated, New York, N.Y., a corporation of New York
Filed Aug. 31, 1961, Ser. No. 135,239
1 Claim. (Cl. 140—71)

This invention relates to forming apparatus and particularly to apparatus for forming a plurality of leads extending from an electron tube support bead.

A support bead has a number of leads varying in length extending through a cut glass cane base in different directions. The leads are usually of a fine guage wire and must be precisely shaped to conform to the desired tube configuration. The electrical operation of the electron tube will be affected if the lead lengths vary from the specified tolerances. In addition, assembly difficulties will arise during the tube manufacture where the lead wires are improperly formed.

Previously, the bead was trimmed by hand from an elongated strip containing the cut glass cane base spaced at intervals along the strip. The bead was then laboriously hand trimmed and formed to make the completed part. This operation was inefficient and unsatisfactory from a quality standpoint since the number of rejects was inordinately high. To produce a high-performance electron tube on a volume basis, the operation was mechanized.

An object of this invention is an apparatus for automatically forming in multi-directions a plurality of leads extending from a vacuum tube support bead.

In accordance with the general features of this invention, the part is strip-fed into a resiliently mounted tool element in a bed of a punch press type machine. Also situated in the bed is an adjustable forming element. A tool support with a spring-backed floating tool element and a fixed element is disposed opposite the bed and cooperates with the bed elements in an operating position. The resiliently mounted tool element in the bed is engaged by the floating tool element to hold the part in position. As the bed element retracts, some of the leads are trimmed by the floating element while others are trimmed by the fixed element in the tool support. Simultaneous forming operations are performed by the adjustable bed element and the fixed element. As the tool support is operated, cam members mounted thereon actuate movable slides for forming a number of leads. This apparatus is adaptable to either a manual or automatic type feed.

Other objects and advantages will be apparent from the following detailed description when considered in conjunction with the accompanying drawings, wherein:

FIG. 3 is a cutaway view of the novel apparatus in a loading position;

FIG. 4 is a view illustrating the initial trimming position of the apparatus;

FIG. 5 represents a typical section of feed stock having support beads spaced at intervals thereon;

Figure 1:
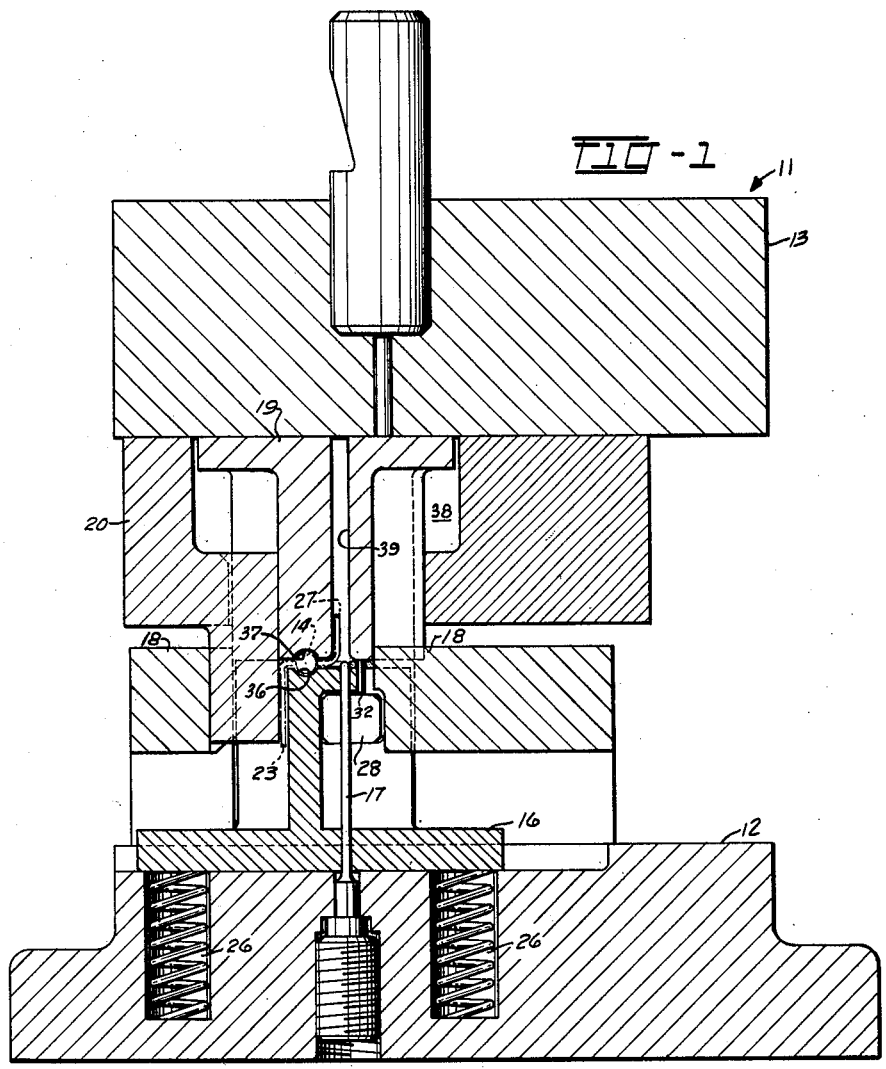
FIG. 1 is a side elevational view of the apparatus for carrying out the invention, parts of which are shown in broken-out section.

With reference to the drawings, the forming apparatus 11 comprising a bed 12 and a tool support 13 disposed opposite the bed 12 is in an open position, as shown in FIGURE 3, to receive the electron tube support bead 14. The bead 14 is fed into an arcuate surface 36 of a resiliently mounted element 16 resting upon bed 12. Thereupon a ram (not shown) of a punch press type machine with the tool support 13 is actuated either automatically or by the operator to move downwardly and cooperate with a bed unit comprising a resiliently mounted element 16, a forming element 17, and a trimming surface 18 to form the support bead 14.

Figure 2:
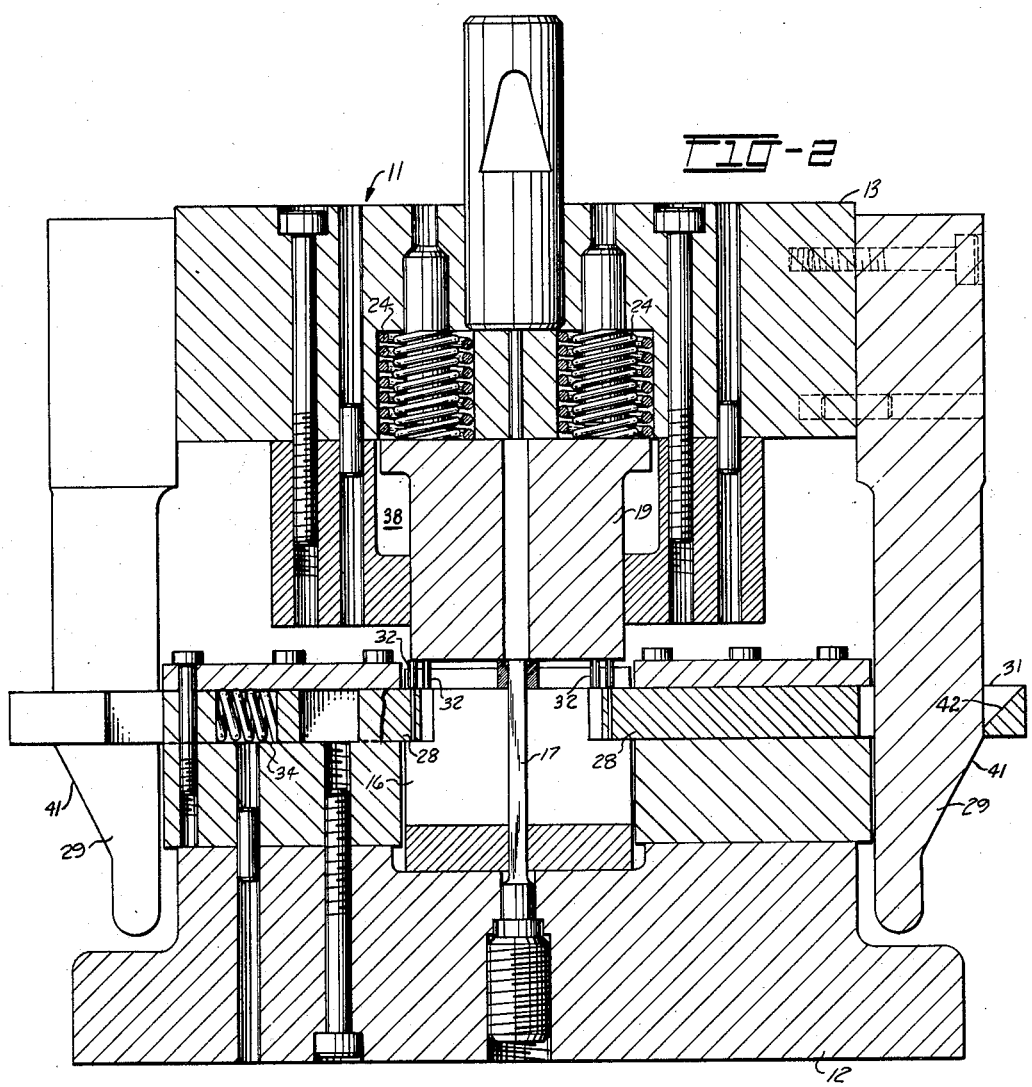
FIG. 2 is a front elevational view for carrying out the invention, parts of which are shown in broken-out section.
Figure 6:
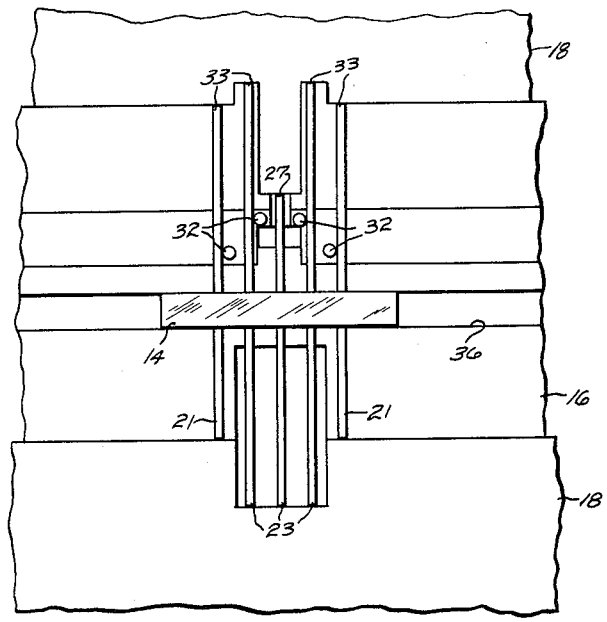
FIG. 6 illustrates a trimmed electron tube support bead in the bed prior to forming.

A spring-backed tool element 19 having an arcuate bottom surface 37 and floating in a channel 38 of support 13 engages the bed element 16 to hold the part in position and works against the spring action of said element 16 to trim the leads 21, 23 and 33 at the trimming surface 18. As seen in FIGURES 1, 2 and 4, the operation of the tool support or mounting plate 13 also results in forming operations on leads 23 as the floating element 19, backed by springs 24, overcomes the pressure of springs 26 to form the leads 23 against the vertical wall of element 16. Simultaneously therewith forming element 17 mounts upwardly within the recess 39 of the floating element 19 to form the lead 27 in a vertical position. The leads 23 are trimmed by the fixed forming element 20 and formed between the element 20 and the resiliently mounted element 16.

Figure 7:
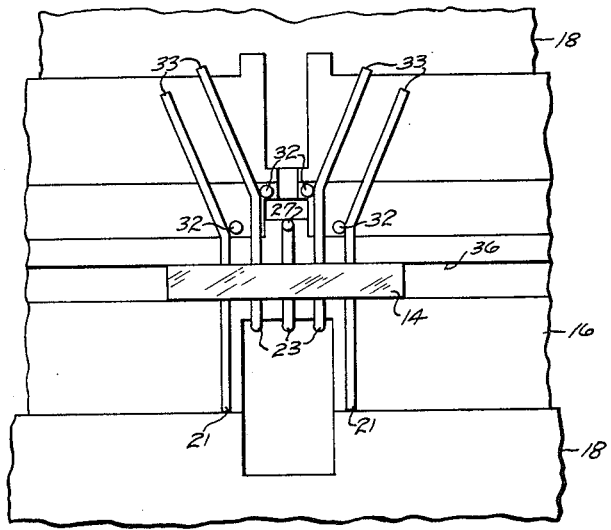
FIG. 7 illustrates the formed tube support bead which is formed by the operation of lateraly movable slides.
Figure 8:
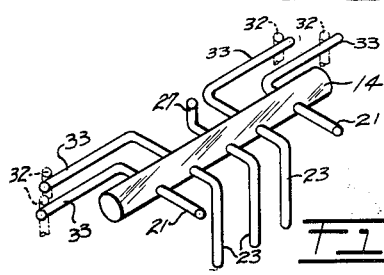
FIG. 8 illustrates a trimmed and formed support bead.

Cam members 29 mounted on the tool support 13 actuate movable slides 28 in the bed 12. The slide motion is determined by the motion of the tool support 13 as transmitted through the cam members 29. A surface 41 on the cams 29 engages an angular surface 42 on the slides 28 as the cams pass through slots 31 on operation of the punch press (not shown). Referring to FIGURE 7, the forming pins 32 situated in the slides 28 engage and form a number of leads 33 at right angles to the previous forming direction of leads 23 and 27. Each slide 28 acts against the action of a spring 34 to form a pair of leads in a direction opposed to that of the other slide. The springs 34 return the slides 28 to their original position when the cams retract.

The preferred embodiment of this apparatus allows for an automatic feed of strip stock into the resiliently mounted element 16; however, manual adaptation of the feed is entirely practical.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

In an apparatus for trimming and forming a plurality of lead wires extending in parallel fashion and in a single plane through an elongated glass bead, a tool bed, a pair of slides mounted on said tool bed for opposed movement toward and away from each other, a support having a recess to receive said bead and support said lead wires in a horizontal plane, said support having an aperture extending vertically therethrough in alignment with one of said lead wires, means for resiliently mounting said support on said bed to project above said slides to position said lead wires to overlie said slides, a forming element secured to the bed and projecting into said aperture and in alignment with one of said lead wires, each of said slides having forming pins extending vertically therefrom for bending at least one of said lead wires, a pair of trimming dies mounted on said bed to subtend said support for receiving the ends of said lead wires, a mounting plate mounted for movement toward said tool bed, a forming member secured to said mounting plate and having outer edges to cooperate with said trimming dies to trim overlying ends of said lead wires, said forming member having an inner edge cooperating with one edge of said support to bend certain of the lead wires extending beyond said support edge, a gripping element slidably mounted on said forming member for gripping the lead wires against the support as the mounting plate moves toward the bed, spring means for urging and spacing said gripping element away from said mounting plate whereupon movement of the mounting plate moves the gripping element into engagement with the lead wires to depress the support means against the resilient means relative to said forming element to move said aligned lead wires into engagement with said forming element, said gripping element having a recess formed therein to receive the forming element as it bends the engaged aligned lead wires, and a pair of oppositely shaped cams secured to the mounting plate which are moved and rendered effective following the depression of the support for engaging and laterally moving said slides outwardly from the support to move said pins to bend said predetermined lead wires.

References Cited by the Examiner
UNITED STATES PATENTS

| | | | |
|---|---|---|---|
| 1,474,882 | 11/23 | Baumgarten | 153—13 |
| 1,811,457 | 6/31 | De Puy et al. | 140—71 |
| 2,653,631 | 9/53 | Vaughan | 140—71 XR |
| 2,713,878 | 7/55 | Stahl | 140—71 |
| 3,063,237 | 11/62 | Onulak | 153—15 |

CHARLES W. LANHAM, *Primary Examiner.*

WILLIAM F. PURDY, KINGSLEY C. PECK,
*Examiners.*